United States Patent [19]
Hämäläinen

[11] Patent Number: 5,966,378
[45] Date of Patent: Oct. 12, 1999

[54] METHOD, DEVICE AND COMMUNICATION NETWORK FOR AVOIDING COLLISIONS IN RADIO COMMUNICATION

[75] Inventor: Jari Hämäläinen, Tampere, Finland

[73] Assignee: Nokia Mobile Phones Ltd., Salo, Finland

[21] Appl. No.: 08/724,909

[22] Filed: Oct. 2, 1996

[30] Foreign Application Priority Data

Oct. 23, 1995 [FI] Finland ..................................... 955030

[51] Int. Cl.⁶ ........................................................ H04J 3/16
[52] U.S. Cl. ........................ 370/348; 370/329; 370/437; 455/509
[58] Field of Search ................................... 370/277, 278, 370/280, 282, 330, 400, 428, 437, 458, 328, 348, 414, 416, 418, 329; 455/509, 517

[56] References Cited

U.S. PATENT DOCUMENTS

| | | | |
|---|---|---|---|
| 4,468,813 | 8/1984 | Burke et al. | 370/428 |
| 5,355,368 | 10/1994 | Dore et al. | 370/95.3 |
| 5,396,496 | 3/1995 | Ito et al. | 370/50 |
| 5,444,698 | 8/1995 | Kito | 370/29 |
| 5,590,400 | 12/1996 | Löppönen | 455/517 |
| 5,649,108 | 7/1997 | Spiegel et al. | 370/400 |
| 5,742,593 | 4/1998 | Sharony et al. | 370/330 |

FOREIGN PATENT DOCUMENTS

| | | |
|---|---|---|
| 0329997 A2 | 8/1989 | European Pat. Off. . |
| 0 539 220 A1 | 4/1993 | European Pat. Off. . |
| 0539220 A1 | 4/1993 | European Pat. Off. . |
| 0564429 A2 | 10/1993 | European Pat. Off. . |
| 0 631 450 A1 | 12/1994 | European Pat. Off. . |
| 2 270 815 | 3/1994 | United Kingdom . |

OTHER PUBLICATIONS

PCT Notification Of Transmittal Of The International Preliminary Examination Report—Form PCT/IPEA/416, PCT/IPEA/409, PCT/Separate Sheet/409.

*Primary Examiner*—Douglas W. Olms
*Assistant Examiner*—Shick Hom
*Attorney, Agent, or Firm*—Parman & Green, LLP

[57] ABSTRACT

The invention relates to a method, device (MS, BTS, GSN) and telecommunication network for avoiding collisions in time divided two-way radio communication, in which messages are transmitted in a first communication direction in a first time slot and in a second opposite communication direction in a second time slot. In the method, device (MS, BTS, GSN) and telecommunication network according to the invention the first time slot in the first direction of communication is detected and, based upon the detection, such a time slot is selected for the second time slot which will not overlap the first time slot.

19 Claims, 5 Drawing Sheets

METHOD, DEVICE AND COMMUNICATION NETWORK FOR AVOIDING COLLISIONS IN RADIO COMMUNICATION

FIELD OF THE INVENTION

This invention relates to a method, device and telecommunication network for avoiding collisions in time divided two-way communication in which messages are transmitted in a first communication direction in a first time slot and in a second opposite communication direction in a second time slot.

BACKGROUND OF THE INVENTION

Most of the present mobile communication systems offer data and speech services based upon circuit switched technology. In the circuit switched technology the communication connection is maintained during the whole connection although no information is transferred at times. This unnecessarily reserves transfer resources also shared by many other users whereby maintaining a circuit switched connection to one subscriber unnecessarily reserves transfer resources of the other users. Another disadvantage in the circuit switched technology is the burstlike characteristic of the data services. Packet switched information transfer is known for making channel utilization more effective.

As well as the fixed networks shall, the future mobile communication network shall be able to relay both circuit switched and packet switched transfer, e.g. ISDN-transfer (Integrated Services Digital Network) and ATM transfer (Asynchronous Transfer Mode). A protocol based on PRMA (Packet Reservation Multiple Access) for relaying packet switched information is known in mobile communication networks. It is also called "Packet Radio". The PRMA is a technology for multiplexing packet formatted digital speech or data into a time divided carrier wave. In other words, PRMA uses in a radio channel Time Division Multiple Access (TDMA) in which transmission and reception take place time divided at predetermined times. The PRMA protocol has been developed for utilizing the discontinuity of voice transfer to support more speech users than the speech channels of a time divided carrier wave provide for. In this case a channel is allocated to a mobile station, e.g. a speech channel when speech is produced and when speech ends the channel is released so that a mobile station does not unnecessarily reserve capacity but the channel is free for use for other purposes, e.g. for transmissions of other mobile stations in the cell. The PRMA protocol is used in cellular mobile communication systems for communication between a mobile station and a base station. The communication link from a mobile station to a base station is referred to as uplink and the communication link from a base station to a mobile station is referred to as downlink.

The known mobile communication systems based upon Time Division Multiple Access (TDMA) utilize usually either TDD (Time Division Duplex) or FDD (Frequency Division Duplex). In a system utilizing the TDD both uplink and downlink transfers are effected usually at the same frequency with time division, that is at different times. The transfer of information is effected in the time slot of a so called TDMA frame, meaning that a mobile station is transmitting in the uplink in e.g. one time slot and the base station is transmitting in the downlink in another time slot. In several communication systems based upon circuit switching e.g. time division is realized by allocating a certain time slot of a frame to a certain mobile station for both uplink and downlink communication and by delaying the uplink frame e.g. by a few time slots compared with the downlink frame, resulting in the same time slots in the uplink frame and the downlink frame not overlapping each other. In this kind of system uplink and downlink communication are dependent on each other, meaning that time slots for a mobile station are allocated in pairs for uplink and downlink, in other words always simultaneously both the transmission and the reception slot. Thus it can be ensured that no collisions occur between uplink and downlink transmissions. On the other hand this kind of procedure is inefficient utilization of resources. If, in addition to this, allocating or reserving of time slots for a certain mobile station is symmetric, it means that a mobile station transmits and receives in equally many time slots in the uplink and in the downlink.

On the other hand, systems are known, such as the system based upon the PRMA protocol and the GSM GPRS (General Packet Radio Service) which is described in more detail later, in which the uplink and downlink transmissions are independent of each other, meaning that a mobile station is allocated separately a transmission time slot for uplink communication and separately a reception time slot for downlink communication, completely independent of each other.

In a system utilizing the above mentioned Frequency Division Duplex (FDD) the uplink and downlink transfers are effected at different frequencies. In a system of this kind transmission and reception can take place simultaneously. On the other hand, there are systems, such as GSM, which utilize both time division and frequency division, meaning that even if transmission and reception take place at different frequencies they do not occur simultaneously.

A problem in the systems, the uplink and downlink transmissions of which are independent of each other, are collisions, meaning that the uplink and downlink transmissions overlap. In systems utilizing independent uplink and downlink transmissions the base station does not know which mobile station is transmitting in the uplink simultaneously when the base station should transmit a packet in the downlink. This kind of a situation is presented in FIG. 1 in which downlink and uplink transmissions are independent of each other and in the figure in the center TDMA frame the uplink and downlink have simultaneous communication to and from the same mobile station, resulting in a collision and at least one of the transmissions is lost. For example, in the above described packet radio system which utilizes uplink and downlink transmissions independent of each other, the packets are formed at moments almost impossible to predict. Likewise, the packets sent by the base station may arrive to the mobile station completely unpredictably. In this case the uplink and downlink transmissions can collide resulting in the loss of data to at least one direction. Collisions may occur between different data flows or between the packets of the same connection, if e.g. a mobile station acknowledges the previous transmission, whereby the acknowledgement in the uplink and the next transmission in the downlink may collide. There is a method for avoiding this kind of collisions, in which a mobile station after each of its transmissions waits for the acknowledgement from the base station before its next transmission. However, it is possible that during the next uplink transmission of the mobile station there is a simultaneous transmission from the base station to the mobile station in the downlink. Another alternative to avoid collisions would be to equip a mobile station with two transceivers. However, this is not desirable because of cost and size. A base station is normally equipped with several transceivers ant that is not a problem, but the real problem lies with mobile stations equipped with one transceiver, which, because of the solution used, cannot send and receive completely simultaneously and are thus incapable of a full-duplex connection.

SUMMARY OF THE INVENTION

One of the objects of this invention is to prevent collisions between transmissions in the uplink and in the downlink. This is achieved in a time divided system in two-way communication by detecting the time slot used in the first direction of communication and by selecting, based upon the detection, for the second direction of communication such a time slot which will not overlap the time slot used in the first direction of communication.

This can according to one embodiment of this invention be realized by proceeding so that if a mobile station knows itself to be of a type incapable of transmitting and receiving simultaneously (here such a mobile station is referred to as simple or half-duplex type mobile station) it detects, eg. in the virtual connection establishment signalling, which time slots will be used in the downlink and selects for its uplink slot a slot which does not overlap the time slot used in the downlink. In this case the mobile station transmits to the network a channel request in such a time slot which does not overlap the downlink time slot, as an indicator that it wants for uplink time slot the time slot the request was transmitted in and at the same informs the network that it is a "simple" mobile station. Additionally, it can inform the number of time slots needed, if it is more than one. As an acknowledgement of the channel reservation the network gives in the downlink the reception time slot to be used for uplink communication. Preferably the network, e.g. a base station, selects respectively the downlink time slot so that it does not overlap the uplink time slot. If overlapping for some reason should occur, the mobile station could not utilize the time slot given to it but it should detect again which time slots are used in the downlink and send a new channel request. If the channel reservation signalling is concentrated in the common control channels of a certain time slot, and the traffic takes place in different time slots, the mobile station can in a channel request indicate the time slots it can use in the uplink. In this case the network, e.g. a base station, can reserve one of the channels indicated as possible by the mobile station for the transmission from the mobile station.

The invention can be realized respectively according to another embodiment by proceeding so that the network, (e.g. a network support node or a base station) while receiving a transmission from an uplink reads from the transmission the mobile station identity and so detects which time slot is used in the uplink (the time slot in which the uplink transmission was received) and selects for the downlink transmission to the mobile station a time slot which does not overlap the uplink transmission. The network informs the mobile station the downlink time slot and the mobile station automatically uses as the uplink time slot the time slot in which the first transmission was received.

The method according to the invention, of which two embodiments were herein before described, can be realized with a device used in time divided two-way communication, which device comprises means for detecting the time slot used in the first direction of communication and means for selecting the time slot for the second direction of communication, based upon the detection, in such a way that it will not overlap said first time slot.

The invention is particularly useful for communication in which the uplink and downlink transmissions are independent of each other.

The method according to the invention is characterized in that the said first time slot used in the first direction of communication is detected, and based upon the detection, for said second time slot such a time slot is selected which does not overlap the said first time slot.

Respectively, the device and the telecommunication network according to the invention is characterized in that it further comprises the means for detecting said first time slot used in the first direction of communication, and means for selecting said second time slot for the second direction of communication, based upon the detection, in such a way that it will not overlap said first time slot.

The invention is described below in detail and references are made to the enclosed drawings in which

DETAILED DESCRIPTION OF THE INVENTION

Figure 1:
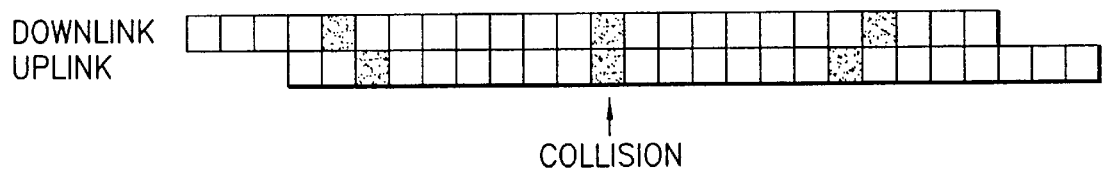
FIG. 1 presents time divided communication in the uplink and in the downlink, and occurrence of a collision, FIG. 2. presents the structure of a telecommunication network in GSM GPRS Packet Radio Service data transfer, FIG. 3. presents an example of the signalling when a mobile station is logging into the network, FIG. 4. presents the realization of a mobile station according to the invention in form of a block diagram, FIG. 5. presents the realization of a base station according to the invention in form of a block diagram, and FIG. 6. presents the realization of a support node according to the invention in form of a block diagram.
Figure 3:
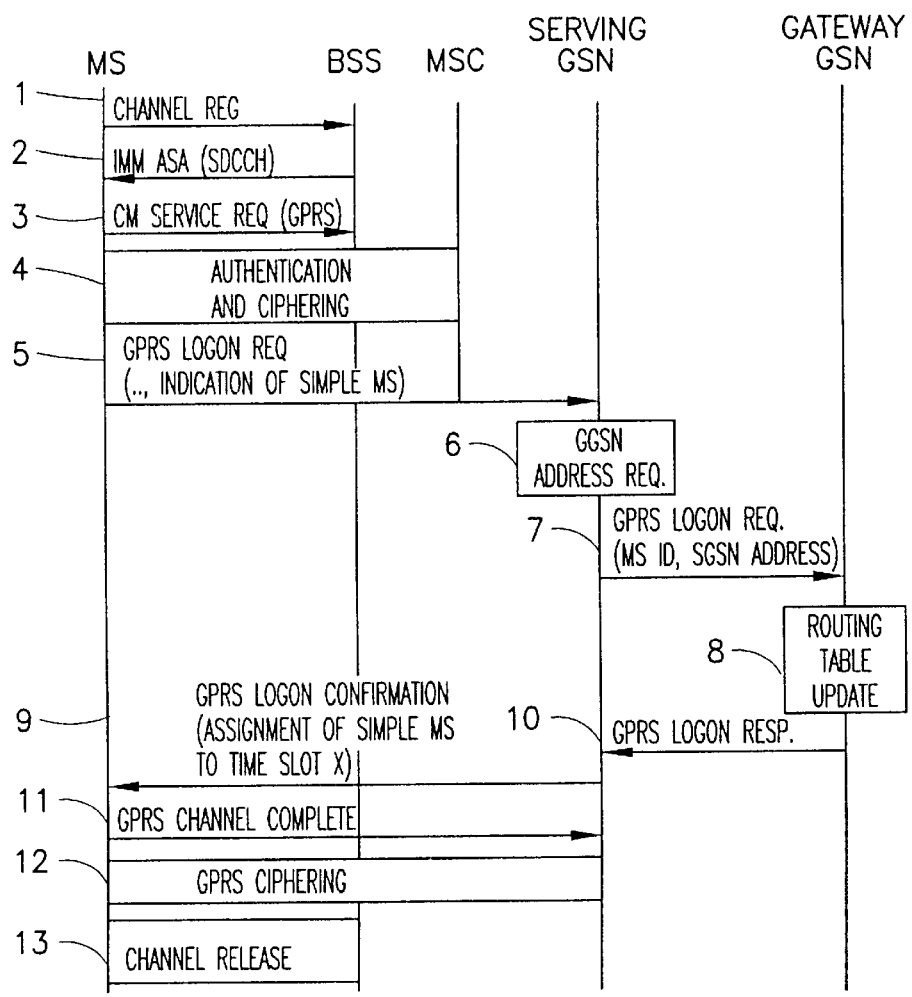
Figure 2:
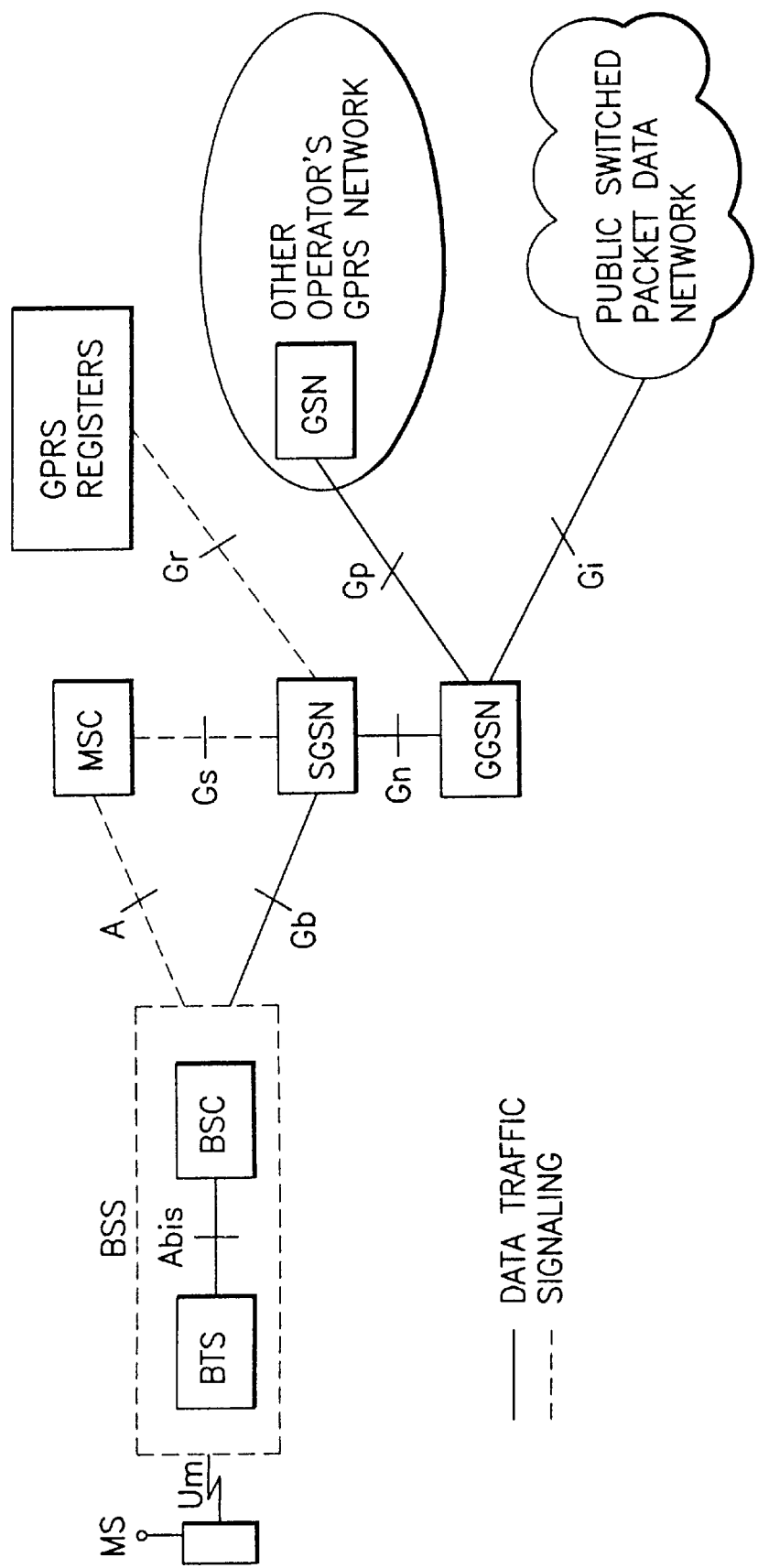

For better understanding of the invention, referring to FIGS. 2 and 3, a prior known packet radio service is described, in which the uplink and downlink transmissions are independent of each other and in which, accordingly, a risk for collision exists. The descriptions apply also as embodiments of the invention when the application environment for the invention is preferably alike. A packet radio service, GSM GPRS (General Packet Radio Service) under development for the GSM mobile radio system is used as an example. GPRS is a new GSM service offering packet radio service for GSM subscribers. GPRS reserves radio resources only when there is something to transmit, allowing the same resources to be shared by all mobile stations according to their needs. The present normal circuit switched network of the GSM system has been designed for circuit switched speech transmissions. The main target of the GPRS service is to realize the connection between a mobile station and a public data network using known protocols such as TCP/IP, X.25 and CLNP. However, there is a connection between the packet switched GPRS service and the circuit switched services of the GSM system. The resources of a physical channel can be reused and certain signalling can be common. Time slots can be reserved in the same carrier wave for use in the circuit switched service and for the packet switched GPRS service.

FIG. 2 presents telecommunication network connections in the packet switched GPRS service. For the GPRS services the main element in the network infrastructure is a GPRS support node, a so called GSN (GPRS Support Node). It is a mobility router that effects the connection and cooperation between the different data networks, e.g. to the public packet data network PSPDN (Public Switched Packet Data Network) through connection Gi or to another operator's GPRS network through connection Gp, mobility management by GPRS registers through connection Gr and relaying of data packets to mobile stations independent of their locations. Physically a GPRS Support Node GSN can be integrated in a MSC (Mobile Switching Center) or it can be a separate network element based in the architecture of data network routers. User data passes directly through connection Gb between the support node GSN and the Base Station System BSS, which consists of Base Stations BTS and Base Station Controllers BSC, but between the support node GSN and the Mobile Switching Center MSC there is the signalling connection Gs. In FIG. 2. The uninterrupted lines between blocks present data traffic and the dashed lines present signalling. Physically the data can pass transparently through the Mobile Switching Center MSC. The radio interface between the Base Station BTS and the mobile station MS is marked by reference Um. The references Abis and A present the interface between the Base Station BTS and the Base Station Controller BSC and respectively between the Base Station Controller BSC and the Mobile Switching Center MSC, which is a signalling connection. The reference Gn presents the connection between the same operator's different support nodes. The support nodes are usually divided to gateway support nodes GGSN (Gateway GSN) and serving or home support nodes SGSN (Serving GSN) as presented in FIG. 2.

FIG. 3 presents in the form of an arrow pattern an example case the different stages when a mobile station logs into a network when the MS is switched on. To begin with, the mobile station and the GPRS network are synchronized which is done similarly as in the normal circuit switched GSM mobile network. When a mobile station wants to log into packet radio operation, for example using GRPS services, it starts a certain logon process, a so called GRPS Logon process. The mobile station MS first transmits to the Base Station System a channel request for radio traffic (stage 1). The Base Station System BSS acknowledges the request (stage 2), after which the mobile station MS sends to the Base Station System BSS a request for packet service (stage 3). After that in the Mobile Switching Center MSC authentication is checked and ciphering keys are exchanged (stage 4) between the mobile station MS and the net, like as prior known from the GSM system. After this the mobile station MS sends to the packet serving support node SGSN (stage 5) a request to log on to the packet service. The request comprises among other the mobile subscriber authentication and parameter information for ciphering. The serving support node SGSN executes the address request process for the connection support node GGSN (stage 6). The serving support node SGSN sends the logon request for packet services to the connection support node GGSN (stage 7) which registers the location of the mobile station MS by updating the Routing Table (stage 8) and responds to the Logon Request (stage 9). At this stage the serving support node SGSN confirms to the mobile station MS its Logon to the packet services (stage 10) and allocates the mobile station MS the identity of a temporary logical link TTLI to be used as an address in the data transmissions between the mobile station MS and the serving support node SGSN. This TLLI is used for identifying the mobile station MS in the Air Interface Um. The Logon Confirmation message from the serving support node SGSN to the mobile station MS usually also contains the identification of the mobile station and the identity of the cell (within which the mobile station is). As to stage 10 it is prior known from circuit switched technology that a mobile station is allocated a certain channel, or a certain time slot in a TDMA frame, to be used for transmission and reception, which means that the uplink and downlink channels are allocated in pairs. In the GSM GPRS packet service a serving support node SGSN informs the mobile station MS about one or more downlink channels for use in the downlink communication. The mobile station MS confirms that it is ready for the packet service connection (stage 11) after which the exchange of ciphering parameters for packet services is executed between the mobile station MS and the serving support node SGSN (stage 12). After this the mobile station goes into idle mode and the channel is released (stage 13).

The mobile station gets the channel in use immediately when it has something to transmit, that is when it transmits to the network (base station) a channel request in form of a PRA (Packet Random Access) burst which also can be called a channel reservation burst. A mobile station can transmit a channel reservation request PRA in a logical reservation channel (so called PRA channel) in a time slot reserved for that purpose. The network acknowledges the request by transmitting to the mobile station a packet acknowledgement burst PAG (Packet Access Grant).

The above described stages presented in FIG. 3 are specified in the GSM GPRS service specification GSM 04.60 and are as such known to persons skilled in the art. In a system like the one presented in FIG. 3 the uplink transmissions from a mobile station MS to a base station BTS and the downlink transmissions from a base station BTS to a mobile station MS are independent of each other and collisions may occur between the uplink and downlink transmissions.

In order to avoid collisions in the mobile communication system in a first embodiment of the invention it is proceeded so that if a mobile station knows itself to be of the type which cannot transmit and receive simultaneously, in other words it is a "simple" mobile station, it informs the network of its capability to communicate (half-duplex/duplex) when it logs on the net, in other words it informs that it is a "simple" mobile station. In the previous example of the GSM GPRS packet service a mobile station can give this information to a serving support node SGSN in stage 5, that is in connection with the GPRS Logon Request. This information can be e.g. one or more bits according to which the base station BTS or the support node SGSN recognizes the mobile station as a "simple" mobile station.

If a mobile station MS moves into the area of another support node SGSN it transmits to this new support node SGSN a request for routing update ( as in FIG. 3—stage 5) and from there the information is passed further to the connection support node GGSN (see stage 7) which updates the information (see stage 8) and transmits a reply to the mobile station (see stages 9 and 10) as an acknowledgement of the Routing Table Update. In this case the mobile station must again, when requesting for the routing update, inform that it is a "simple" mobile station. This kind of information can also include the information of how many time slots are requested.

When a mobile station has been recognized as a "simple" mobile station the base station BTS or the support node SGSN knows to allocate it a certain reception time slot for communication in the downlink in order to avoid a situation in which the mobile station, when it later has something to transmit, transmits a channel request PRA in such a time slot that a collision with a transmission in the downlink occurs. This can happen in stage 10 in the example in FIG. 3 when the support node SGSN confirms the mobile station Logon to packet services.

If a mobile station MS moves into the area of another support node SGSN and it has transmitted to this new support node SGSN a request for routing update, as was described above, it receives from the new support node SGSN together with a confirmation for the Routing Update request (see FIG. 3—stage 10) the information on the time slot to be used in the downlink.

When a mobile station MS has something to transmit it detects e.g. from control channels (which are prior known to skilled persons from e.g. the GSM GPRS system) using an access control algorithm MAC (Media Access Control) ) a time slot or time slots in which it is allocated a turn to transmit. Additionally, the mobile station knows already since the Logon process the time slot/slots which have been allocated for the transmissions in the downlink. Based upon the detection the mobile station MS transmits to the network a channel request PRA in such a time slot which does not overlap the time slot used in the downlink. As an indication for that it wants for the uplink time slot the same time slot in which the request was transmitted, it informs the network that it is a "simple" mobile station. Additionally, it can inform the number of time slots needed, if more than one is needed. The number of time slots in the uplink need not be the same as in the downlink, but the mobile station can reserve e.g. three time slots in the uplink and request two time slots in the downlink.

If channel request signalling takes place centrally in the common control channels of a certain time slot and traffic in other time slots a mobile station MS can in a channel reservation request PRA indicate the time slots it can use in the uplink. This kind of information can be 8 bits and if there are 8 channels, or actually time slots in a TDMA frame, as in the GSM system, each bit refers to a channel. The bit value "0" can indicate a channel the mobile station does not want and the bit value "1" can indicate a channel the mobile station wishes to use for communication in the uplink. Alternatively, the information can be 4 bits when one bit indicates that it is "simple" and three bits indicate the order number (0 to 7 in binary form) of the slot in which the MS is capable of reception. The network then allocates the mobile station an appropriate channel for transmission in the uplink. The downlink data channels suitable for the mobile station MS in question must have been negotiated already at the Logon (FIG. 3). Now the net, e.g. base station BTS, can reserve for the transmissions of the mobile station one of the channels wished for by the MS.

In the confirmation of the channel request the network allocates the time slot for communication in the downlink. Preferably the network, e.g. the network support node SGSN or the base station BTS, selects respectively the time slot in the downlink so that it will not overlap the uplink time slot. If overlapping should for some reason occur the mobile station MS could not utilize the time slot allocated for it, but should have to transmit a new channel request PRA.

A mobile station has the means for detecting the time slot used in the downlink and means for selecting the uplink time slot, based on the detection, so that it will not overlap the time slot used in the downlink. This part of the realization of a mobile station is described more elaborately later in this document.

In order to avoid collisions it is so proceeded in the mobile communication system in another embodiment of the invention that the network (e.g. a network support node SGSN or a base station BTS), at receiving a transmission from a mobile station MS in the uplink, reads from the transmission the authentication of the mobile station and so detects the time slot used in the uplink and selects for transmission in the downlink such a time slot which will not overlap the uplink transmission.

In connection with the channel request PRA in the uplink from a mobile station MS a base station BTS reads from the channel request burst PRA the authentication of the mobile station and so detects the time slot used in the uplink and selects for transmission in the downlink to the mobile station in question a time slot which does not overlap the uplink transmission. The base station BTS acknowledges the packet request in the channel request PRA with an acknowledgement PAG, in which it informs the mobile station MS of the time slot to be used. For the realization of this second embodiment the network, e.g. a base station BTS, has means for detecting the time slot used in the uplink and means for selecting the downlink time slot, based upon the detection, so that the downlink time slot will not overlap the time slot used in the uplink. A base station can have e.g. a lookup table in which it updates the uplink and downlink time slots for different mobile stations. The realization of a base station is for this part described in more detail later in this document.

In case of a system in which more than one time slot is used in the uplink and downlink the network selects respectively all time slots in the downlink so that they will not overlap the time slots in the uplink.

When the above first and the second embodiment are compared they have the difference that in the second embodiment a base station must identify a mobile station in some way, that is to receive its authentication (actual, temporary or other identification). This could be a problem. For example in the 87-bit channel request burst or Access Burst, which comprises only 36 not channel coded bits for information, there is no room for the mobile station identification number or code. In this case a base station BTS cannot know from the PRA burst it receives, which of the mobile stations within its area has sent the burst.

A mobile station in the first embodiment and respectively a base station in the second embodiment are capable of selecting such a time slot for transmission in the uplink and respectively for transmission in the downlink that they will not overlap, because the mobile station has been synchronized to the net, as prior mentioned, which is the first action after a mobile station is switched on. Additionally, as in the prior known systems based upon TMDA technology, a mobile station comprises a timer, by means of which the mobile station knows the exact timing of the uplink and downlink time slots.

Figure 4:
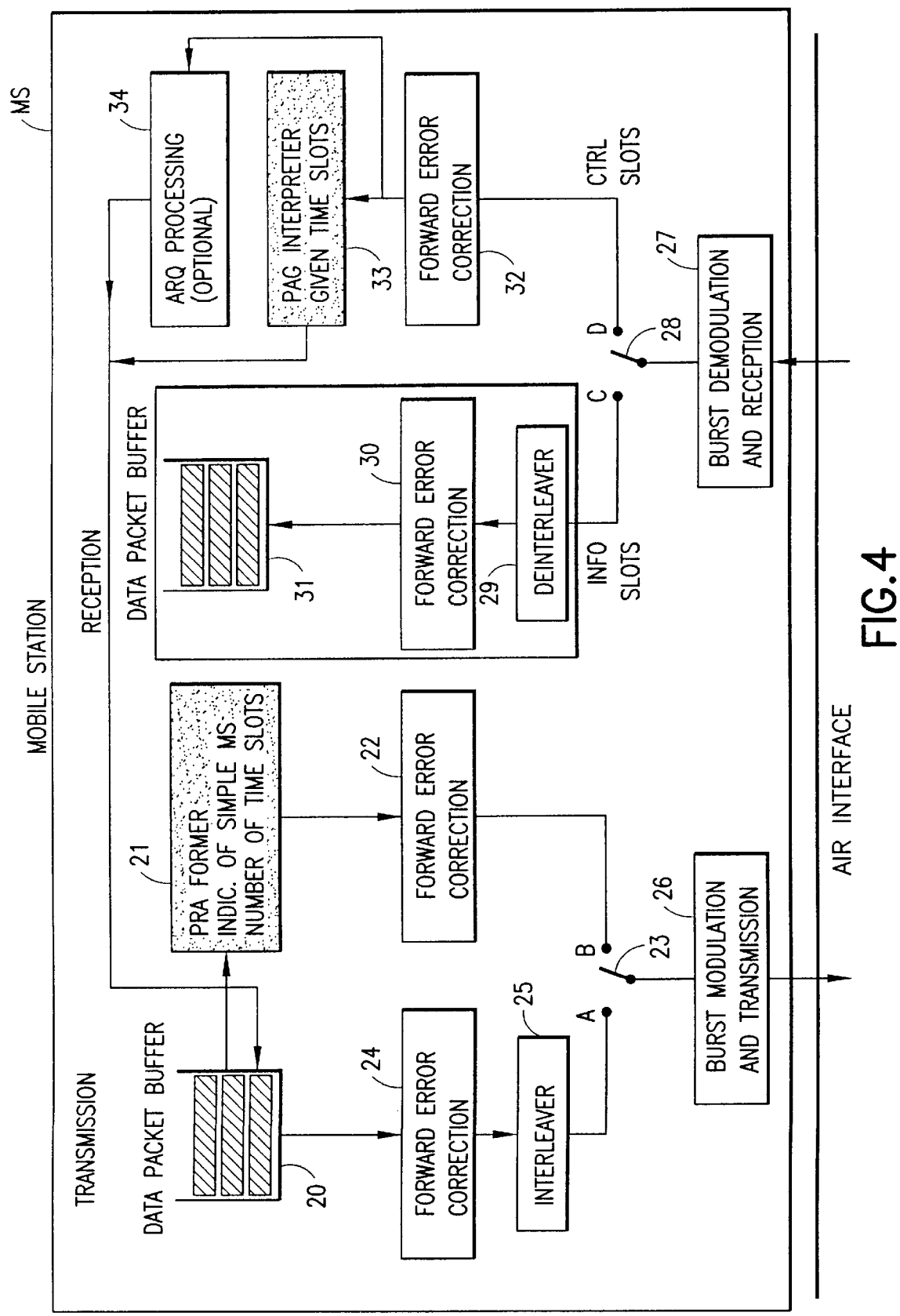

In following an embodiment of a mobile station MS according to the claimed invention is described with reference to FIG. 4. The transmission part has a buffer 20, in which the data to be transmitted is saved. The buffer 20 has a control connection to the channel request (or PRA) former 21 (PRA, Packet Random Access), which knows the capability of the mobile station, that is whether it is capable of full-duplex or half-duplex connections. When data has been saved in the buffer 20 it sends a control signal to the PRA-former 21 which then forms a channel request for a PRA transmission. If the mobile station is of the half-duplex type, the PRA former forms such a packet channel request burst PRA which comprises the information of the mobile station being a "simple" mobile station and the number of the eventually requested time slots. Forming a channel request and the PRA former are prior known to persons skilled in the art. For the embodiment of the invention bits are added into the PRA burst in the PRA former 21 in order to add the above mentioned information in the burst. The burst in anyway a group of bits which are formed in the PRA former 21. The modification or addition of the information is executed by forming a burst which is slightly different from a normal burst in relation to the added information.

Additionally, according to the embodiment according to the invention, the transmission of the PRA burst can be executed in a time slot in which collisions in data transfer are avoided. The data bits in the PRA burst are FEC (Forward Error Correction) error coded in the error coding unit 22 and they are passed to the switch 23. Data is passed to switch 23 also from the buffer 20, from which packets to be transmitted are taken for packet transmission and FEC (Forward Error Correction) error coding in the second error coding unit 24 and taken to the interleaving unit 25, in which the data is interleaved for transmission. The switch 23 is in position A while data packets are transmitted and in position B while the channel request burst PRA is transmitted. One end of the switch 23 is arranged to supply data further to the modulator and transmission unit 26, in which the data is modulated and transmitted in burst(s) to the air interface. The PRA former 21 belongs as a part in the MAC (Multiple Access Control or Media Access Control, not separately seen in the figure) unit controlling the packet radio operation of the mobile station. The MAC control unit requests for its uplink time slot such a time slot which does not overlap the time slot used in the downlink and controls the PRA burst to be transmitted in an uplink time slot selected by itself.

In the reception part a burst is received and demodulated in reception and demodulation unit 27 which is further connected to a second switch 28 which while being in position C receives bursts containing data packets, for which bursts deinterleaving is executed in unit 29 and error detection and correction are done in the FEC Error Correction Unit 30, from which the received data packets are saved in a second buffer 31 for further processing. When the mobile station has transmitted in the packet channel request burst PRA the information of its "simple" type, it remains waiting for a packet request acknowledgement message PAG with switch 28 in position D. Equally, in general, when a mobile station is waiting for messages coming in control channels (control time slots), the switch is in position D. The PAG message contains the information of the time slot(s) allocated to the mobile station in the uplink. The PGA message burst is correspondingly error indicated and corrected in a second FEC Error Correction Unit 32, from which it is taken to the PAG interpreter 33, which is preferably a detector which reads the received message and indicates whether it contained channel reservation information. The PAG interpreter 33 controls the transmission part buffer 20 and when the channel reservation arrives, the mobile station starts to transmit data from the buffer 20 in the allocated time slot. Even the PAG interpreter 33 is a part of the MAC control unit. In FIG. 4 there is also presented an ARQ unit 34 for forming an automatic retransmission request ARQ (Automatic Retransmission reQuest) for transmission and for processing an automatic retransmission request received in a reception burst. The ARQ unit 34 is optional depending on the packet service protocol used and is not of essential importance for the invention.

Figure 5:
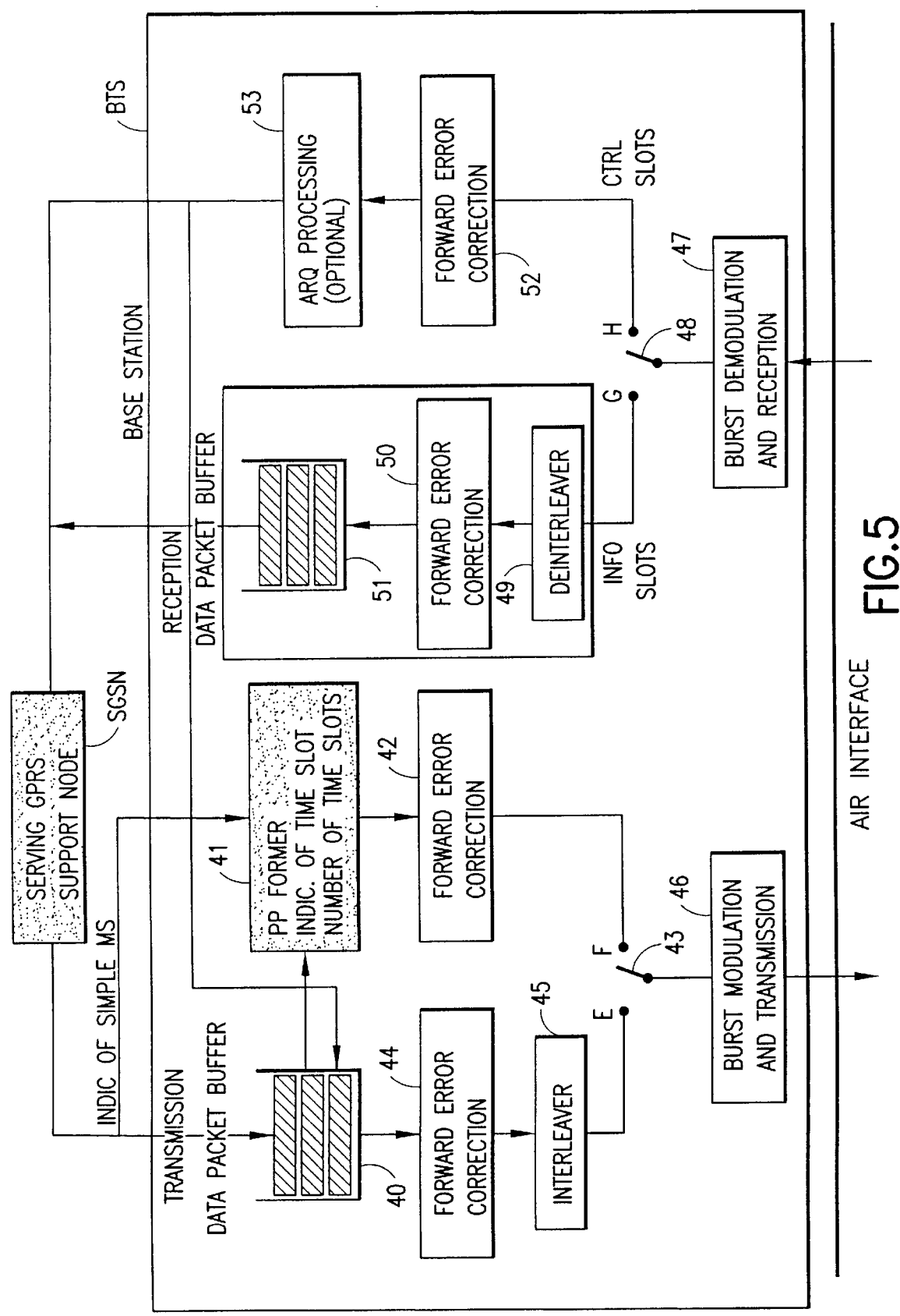

In following an embodiment of a base station BTS according to the claimed invention is described with reference to FIG. 5. The transmission part has a buffer 40, in which the data to be transmitted is saved. The buffer 40 has a control connection to the PP (Packet Paging) former 41. Packet Paging PP is used for informing a mobile station of a packet transmission to be transmitted to the MS. Data coming from a fixed network, e.g. Internet, comes to a Serving Support Node SGSN which transfers the data for transmission to the mobile station MS. The packets from the Support Node SGSN arrive in buffer 40 in a base station BTS (or base station system BSS). When data has been saved in the buffer 40 it sends a control signal to the PP former 41 which now forms a Packet Paging message to the mobile station. The Packet Paging message PP is FEC (Forward Error Correction) error coded (or convolution coded) in the error coding unit 42 and it is passed to the switch 43. Data is passed to switch 43 also from the buffer 40, from which packets to be transmitted are taken for packet transmission and FEC (Forward Error Correction) error coded in the second error coding unit 44 and taken to the interleaving unit 45, in which the data is interleaved for transmission. The switch 43 is in position E while data packets are transmitted and in position F when the Packet Paging message PP is transmitted. One end of the switch 43 is arranged to supply data further to the modulator and transmission unit 46, in which the data is modulated and transmitted in burst(s) to air interface. When establishing the virtual connection (in the GPRS Logon-stage (FIG. 3)) the mobile station has informed the Support Node SGSN that it is a "simple" mobile station, meaning that it cannot receive in just any random time slot. Thus the Support Node SGSN knows to transmit packets only in appropriate channels and within the packets it even tells the appropriate time slots to the base station BTS/ base station system BSS, so that the base station system knows to transmit the Packet Paging message PP in such a time slot which the mobile station is listening to. When the Packet Paging message PP has been transmitted to the mobile station MS, the base station BTS can at the agreed time transmit data to the mobile station MS on the agreed channel (in other words at the negotiated frequency in the agreed time slot).

In the reception part a burst is received and demodulated in reception and demodulation unit 47 which is further connected to a second switch 48 which while being in position G receives bursts containing data packets, for which bursts deinterleaving is executed in unit 49 and error detection and correction are done in the FEC Error Correction Unit 50 from which the received data packets are saved in another buffer 51 for further processing. When the base station expects to receive from the mobile station MS a Random Access burst PRA, or other control messages, the switch 28 is in position H and at other times in position G when data is expected. The received control messages are correspondingly error indicated and corrected in a second FEC Error Correction Unit 52, from which they are passed to the processing unit 53, which can also comprise a function for forming an automatic retransmission request ARQ (Automatic Retransmission reQuest) for transmission and for processing an automatic retransmission request received in a reception burst. The ARQ function 34 is optional depending on the packet service protocol used and is not necessary for the invention. The processing unit 53 controls the buffer 40 and relays information to the Support Node SGSN and when the channel request PRA arrives, the base station BTS transmits in the agreed time slots to the mobile station MS a packet request acknowledgement PAG. The base station BTS transmits the information on the reservation of the downlink in the Packet Paging PP channel. The base station BTS receives data packet transmissions that are relayed to Support Node SGSN to be further relayed in the telecommunication network e.g. to Internet.

Figure 6:
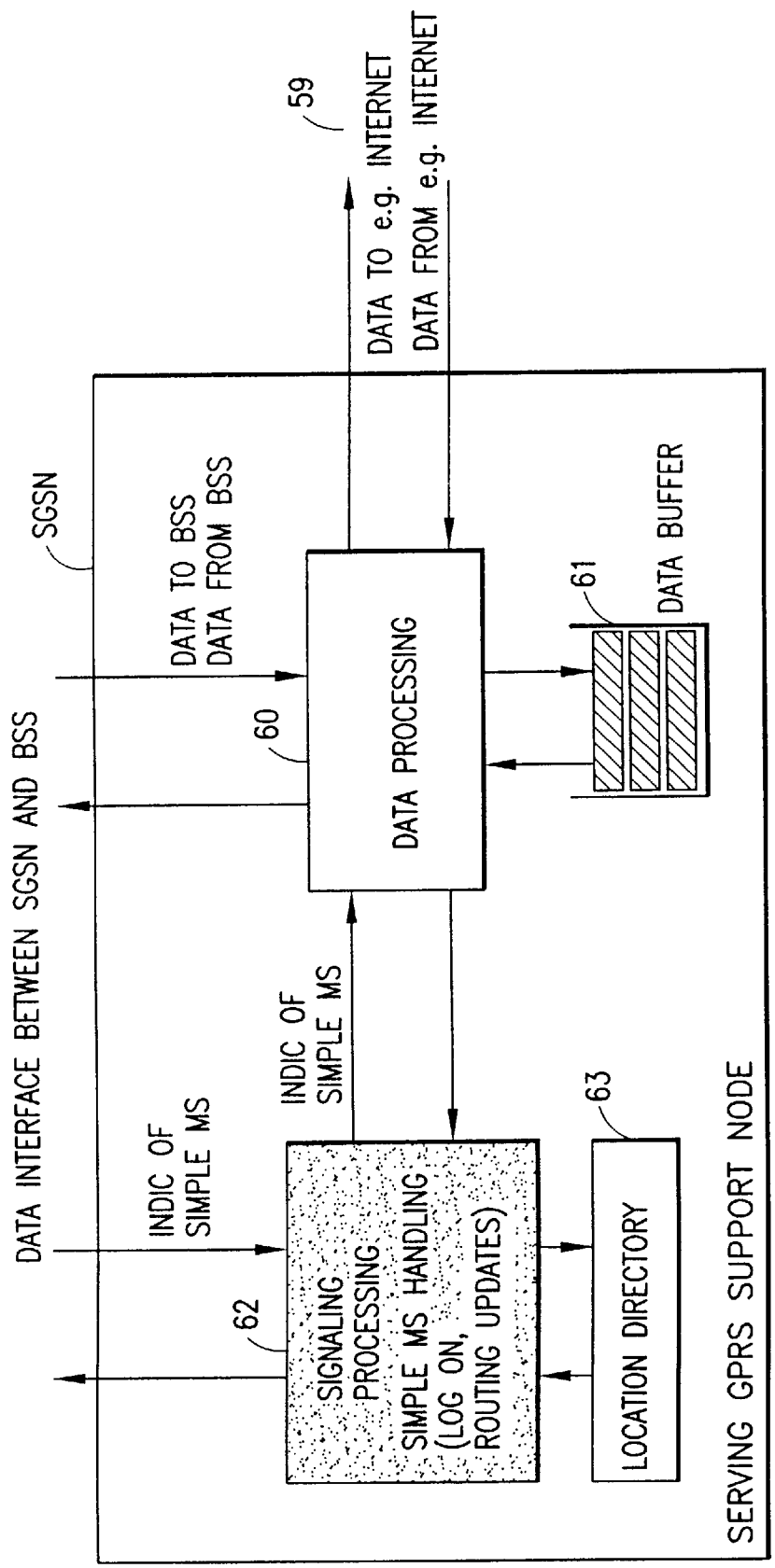

In following an embodiment of a Support Node SGSN according to the claimed invention is described with reference to FIG. 6. Data arriving from a fixed data network 59, e.g. Internet, to the Support Node SGSN is processed in the data processor 60 and saved in the buffer 61. The data processor 60 asks the signalling processor 62, where to send the packet and the signalling processor 62 seeks from Location Directory 63, which can be realized as a lookup table saved in the memory, the information in which channel the packet shall be transmitted to the mobile station MS in question. The signalling processor 62 relays the information on the time slot to the data processor 60 which forwards the data packet to be sent from the buffer 61 to the base station BTS in the correct channel and adds into it the information on the time slot in which the data shall be transmitted to the mobile station in the air interface.

This invention reduces the risk for collisions in a communication network, preferably even totally prevents it, particularly in the mobile communication system of a communication network, in time divided, two-way communication in the radio way in which messages are transmitted in the uplink in one time slot and in the downlink in another time slot independent of each other. The invention facilitates in a communication system as above, the use of a mobile station comprising one transceiver, with the risk for collision still remaining small or even non-existent.

The previous is a presentation of the realization and the embodiments of the invention using examples on the method, device and the system environment for the devices. For a person skilled in the art it is self evident that the invention is not limited to the details in the above embodiments and that the invention can be realized also in another form without deviating from the characteristics of the invention. The presented embodiments should be regarded informative but not limiting. Thus the possibilities for realization and use of the invention are limited only by the enclosed claims. Thus the different alternatives for realizing the invention defined by the claims including equivalent realizations are covered by the invention.

What is claimed is:

1. A method for avoiding collisions between time divided two-way communications provided between a mobile station and a base station of a telecommunication network, wherein first messages are sent in a first direction of communication in a first channel from the mobile station to the base station, and second messages are sent in a second, opposite direction of communication in a second channel from the base station to the mobile station, the method comprising the steps of:

after an individual one of the first messages sent from the mobile station is received by the base station, detecting within the base station the first channel used in the first direction of communication based on an identifier of the mobile station included in one of the first messages received by the base station;

based upon the detecting step, selecting as the second channel for the second direction of communication another channel which does not overlap the first channel; and communicating the selected second channel from the base station to the mobile station.

2. The method according to claim 1, wherein the first and second channels for the mobile station are allocated by the base station independently of one another.

3. The method according to claim 1, wherein for communication between the base station and a plurality of mobile stations, a further step is performed of updating information in a register relating to the first and second channels used in the first and second directions of communication for each individual mobile station.

4. The method according to claim 1, further comprising a step of the mobile station informing the telecommunication network of a communication capability of the mobile station.

5. The method according to claim 1, wherein the first and second channels each comprise at least one time slot.

6. The method according to claim 5, wherein the first channel comprises a different number of time slots than the second channel.

7. A mobile station for time divided two-way communication with a base station in a telecommunication network, wherein within the telecommunication network first messages are sent in a first channel in a first direction of communication from the base station to the mobile station, wherein second messages are sent in a second channel in a second, opposite direction of communication from the mobile station to the base station, and wherein said first and second channels are allocated within the telecommunication network in such a manner that said first and second channels have a non-overlapping relationship, said mobile station comprising first communication means for communicating with the base station in the first direction of communication using the first channel, second communication means for communicating with the base station in the second direction of communication using the second channel, and means for informing the telecommunication network of a communication capability of the mobile station for providing the telecommunication network with an indication that the mobile station is capable of one of communicating in the first and second channels at different times only, or simultaneously communicating in the first channel and the second channel.

8. The mobile station according to claim 7, wherein the first and second channels each comprise at least one time slot.

9. The mobile station according to claim 8, wherein the mobile station further comprises means for informing the base station of the number of time slots needed for the first and second channels.

10. The mobile station according to claim 7, wherein the first and second channels are allocated independently of one another.

11. A device for providing time divided two-way communication with a mobile station in a telecommunication network, wherein within the telecommunication network first messages are sent in a first channel in a first direction of communication from the mobile station to the device, and second messages are sent in a second channel in a second, opposite direction of communication from the device to the mobile station, said device comprising:

first communication means for communicating with the mobile station in the first direction of communication using the first channel;

second communication means for communicating with the mobile station in the second direction of communication using the second channel;

means for communicating to the mobile station at least one channel allocated for the mobile station as the first channel for enabling the mobile station to communicate with the device in the first direction of communication;

means for detecting said first channel used in the first direction of communication by detecting the identity of the mobile station based on an individual one of the first messages received by the device from the mobile station;

means for selecting as said second channel for the second direction of communication from the device to the mobile station, another channel which does not overlap the first channel detected by said detecting means; and means for communicating the second channel to the mobile station.

12. The device according to claim 11, wherein the device is a base station.

13. The device according to claim 11, wherein the device is a base station system comprising at least one base station and a base station controller.

14. The device according to claim 11, wherein the device is a telecommunication network support node.

15. The device according to claim 11, wherein each of the first and second channels comprises at least one time slot.

16. The mobile station according to claim 11, wherein the first and second channels for the mobile station are allocated independently of one another.

17. A telecommunication network comprising a support node, a base station, and a mobile station, wherein for providing time divided two-way communications, said telecommunication network comprises means for communicating in a first direction of communication using a first channel, means for communicating in a second direction of communication using a second channel, and means for communicating to the mobile station at least one channel allocated for the mobile station as the first channel, and wherein said telecommunication network further comprises:

means for detecting said first channel used in the first direction of communication by detecting the identity of the mobile station based on a message received from the mobile station;

means for selecting as said second channel for the second direction of communication, another channel which does not overlap said first channel; and means for communicating the second channel to the mobile station.

18. The network according to claim 17, wherein each of the first and second channels comprises at least one time slot.

19. The mobile station according to claim 17, and further comprising means for allocating the first and second channels for the mobile station independently of one another.

\* \* \* \* \*